(12) United States Patent
Tomoike

(10) Patent No.: US 7,747,744 B2
(45) Date of Patent: Jun. 29, 2010

(54) MOBILE COMMUNICATION SYSTEM AND DATA TRANSFERRING METHOD FOR USE WITH MOBILE COMMUNICATION SYSTEM

(75) Inventor: Hiroyuki Tomoike, Tokyo (JP)

(73) Assignee: NEC Corporation, Tokyo (JP)

( * ) Notice: Subject to any disclaimer, the term of this patent is extended or adjusted under 35 U.S.C. 154(b) by 1695 days.

(21) Appl. No.: 10/058,805

(22) Filed: Jan. 30, 2002

(65) Prior Publication Data

US 2002/0107964 A1 Aug. 8, 2002

(30) Foreign Application Priority Data

Feb. 2, 2001 (JP) ............................. 2001-027205

(51) Int. Cl.
*G06F 15/16* (2006.01)
(52) U.S. Cl. ...................... 709/225; 709/213; 370/352; 455/466; 455/445; 455/436
(58) Field of Classification Search ................ 715/513; 455/557, 412.1, 445, 436, 466; 370/352; 709/224, 230
See application file for complete search history.

(56) References Cited

U.S. PATENT DOCUMENTS

| | | | |
|---|---|---|---|
| 5,793,762 A | 8/1998 | Penners et al. | |
| 5,896,369 A | 4/1999 | Warsta et al. | |
| 5,978,386 A | 11/1999 | Hamalainen et al. | |
| 6,122,527 A * | 9/2000 | Robinson et al. | 455/557 |
| 6,301,480 B1 * | 10/2001 | Kennedy et al. | 455/445 |
| 6,374,245 B1 * | 4/2002 | Park | 707/10 |
| 6,381,465 B1 * | 4/2002 | Chern et al. | 455/466 |
| 6,466,571 B1 * | 10/2002 | Dynarski et al. | 370/352 |
| 6,490,451 B1 * | 12/2002 | Denman et al. | 455/436 |
| 6,609,005 B1 * | 8/2003 | Chern | 455/457 |
| 6,610,105 B1 * | 8/2003 | Martin et al. | 715/513 |
| 6,751,454 B2 * | 6/2004 | Thornton | 455/412.1 |
| 6,804,537 B1 * | 10/2004 | Fujii | 455/557 |
| 7,076,553 B2 * | 7/2006 | Chan et al. | 709/226 |

FOREIGN PATENT DOCUMENTS

EP   10566247 A2   11/2000

(Continued)

OTHER PUBLICATIONS

Y. Lim et al., "Performance Evaluation of the Bluetooth-based Public Internet Access Point", Department of Mechanical Engineering, (Jan. 31-Feb. 2, 2001), pp. 634-648 with Abstract.

(Continued)

*Primary Examiner*—Tammy T Nguyen
(74) *Attorney, Agent, or Firm*—Sughrue Mion, PLLC

(57) ABSTRACT

A mobile communication system is disclosed which comprises: an information terminal unit; a plurality of mobile stations, each of which communicates with the information terminal unit; a packet mobile switching center which communicates with the plurality of mobile stations through a radio access network; a packet mobile gateway switching center which communicates with the packet mobile switching center through a mobile data network; and a content server which communicates with the packet mobile gateway switching center through the Internet; wherein the information terminal unit downloads or uploads data from or to the content server through the plurality of mobile stations.

7 Claims, 6 Drawing Sheets

FOREIGN PATENT DOCUMENTS

| | | |
|---|---|---|
| GB | 2 361 603 A | 10/2001 |
| JP | 9-83432 A | 3/1997 |
| JP | 9-200862 A | 7/1997 |
| JP | 10-094055 A | 4/1998 |
| JP | 11-112664 A | 4/1999 |
| JP | 11-234749 A | 8/1999 |
| JP | 11-308176 A | 11/1999 |
| JP | 11-313374 A | 11/1999 |
| JP | 2001-8274 A | 1/2001 |
| JP | 2002-541602 A | 12/2002 |
| JP | 2003-501973 A | 1/2003 |
| WO | WO 99/17499 A3 | 4/1999 |
| WO | WO 00/28494 A1 | 5/2000 |
| WO | WO 00/62260 A1 | 10/2000 |
| WO | WO 00/76238 A1 | 12/2000 |
| WO | WO 01/79973 A2 | 10/2001 |
| WO | WO 01/97454 A1 | 12/2001 |

OTHER PUBLICATIONS

R. Comerford, "Handsheld duke it out for Internet", IEEE Spectrum, (Aug. 2000), vol. 37, pp. 35-41.

D. Famolari et al., "Architecture and Performance of an Embedded IP Bluetooth Personal Area Network", IEEE International Conference Personal Wireless Communications, (Dec. 20, 2000), pp. 75-79 with Abstract.

P. Galla, "How wireless works", How Cell Phones Make Calls, (Sep. 2001), pp. 78-81.

* cited by examiner

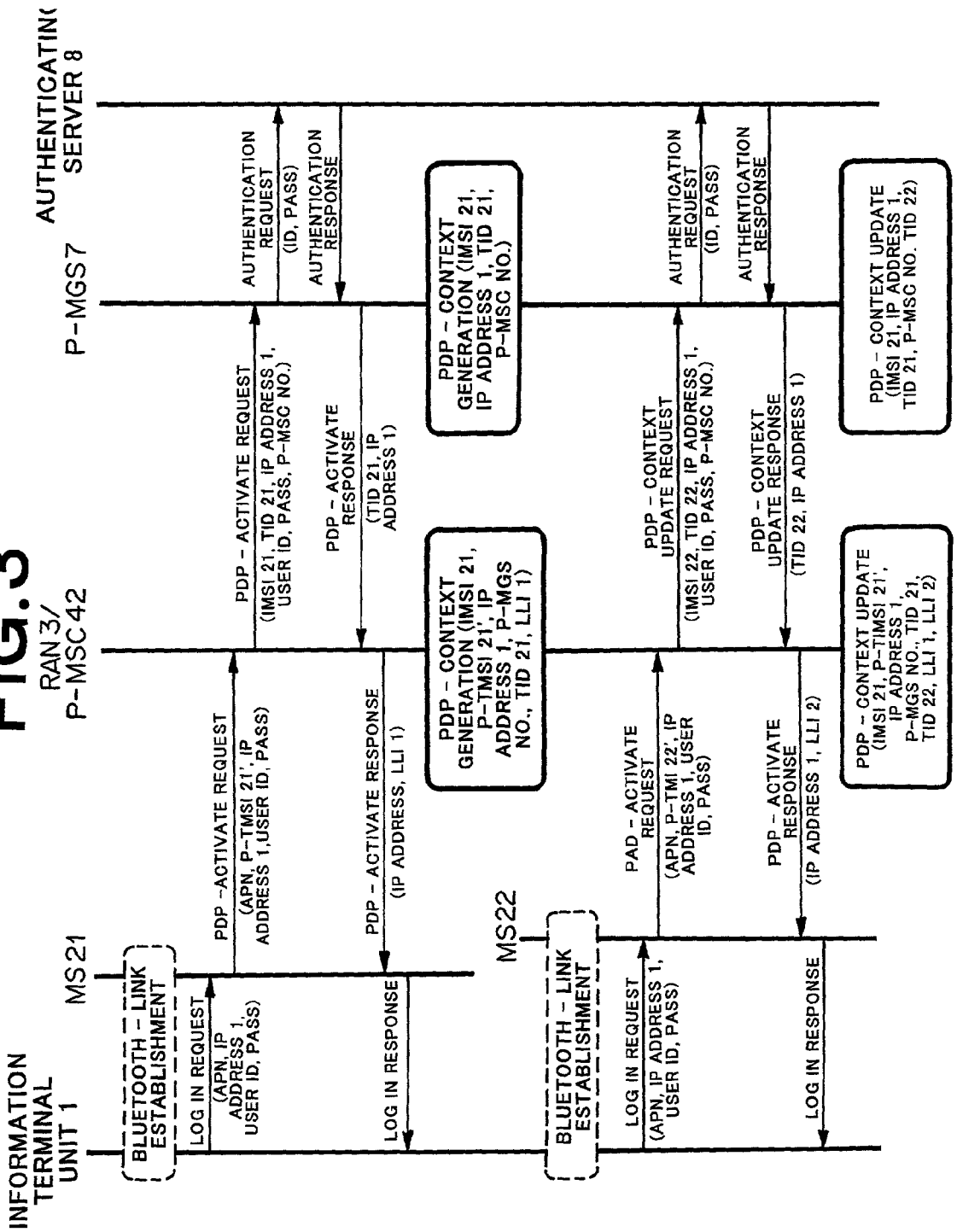

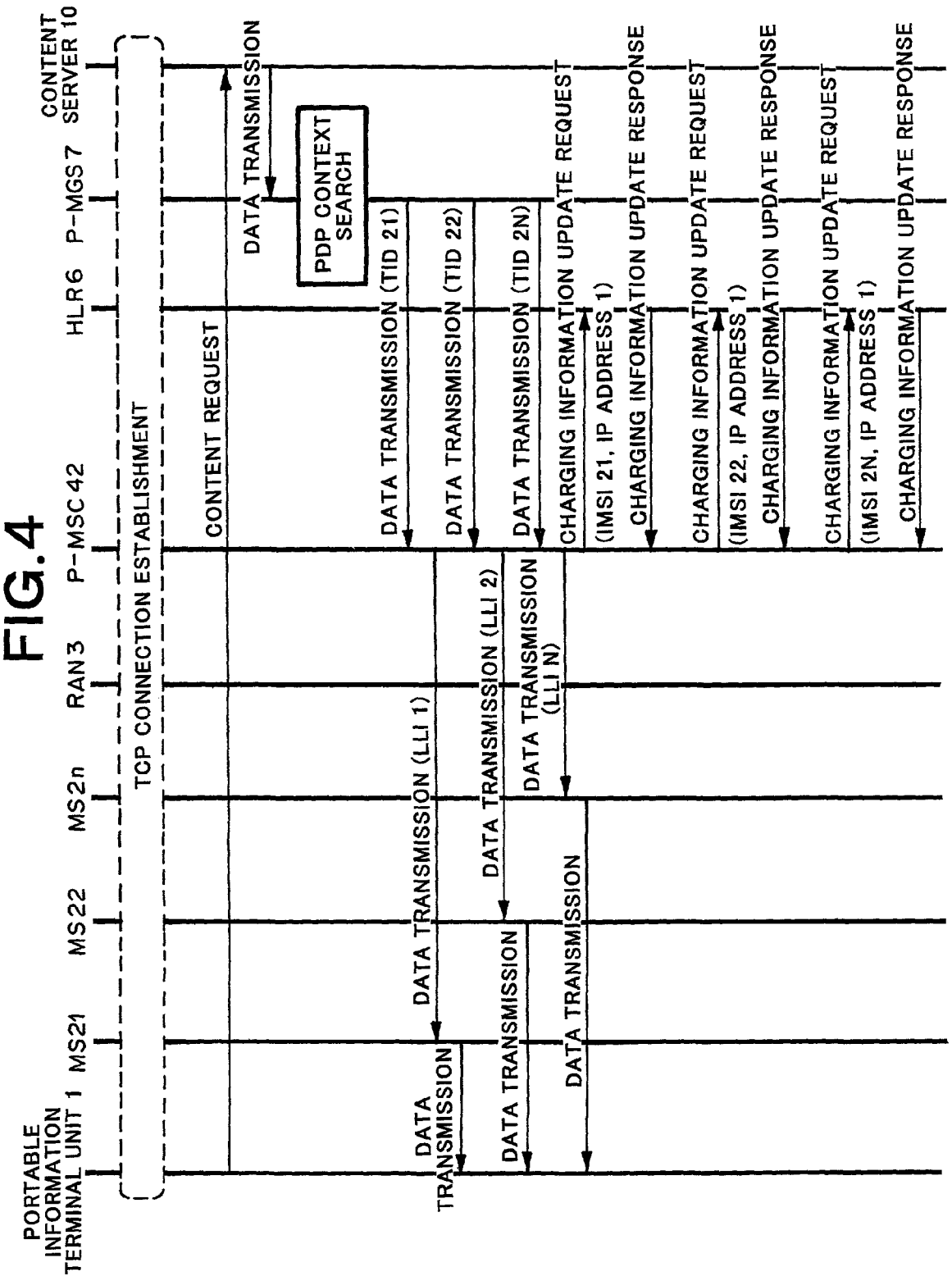

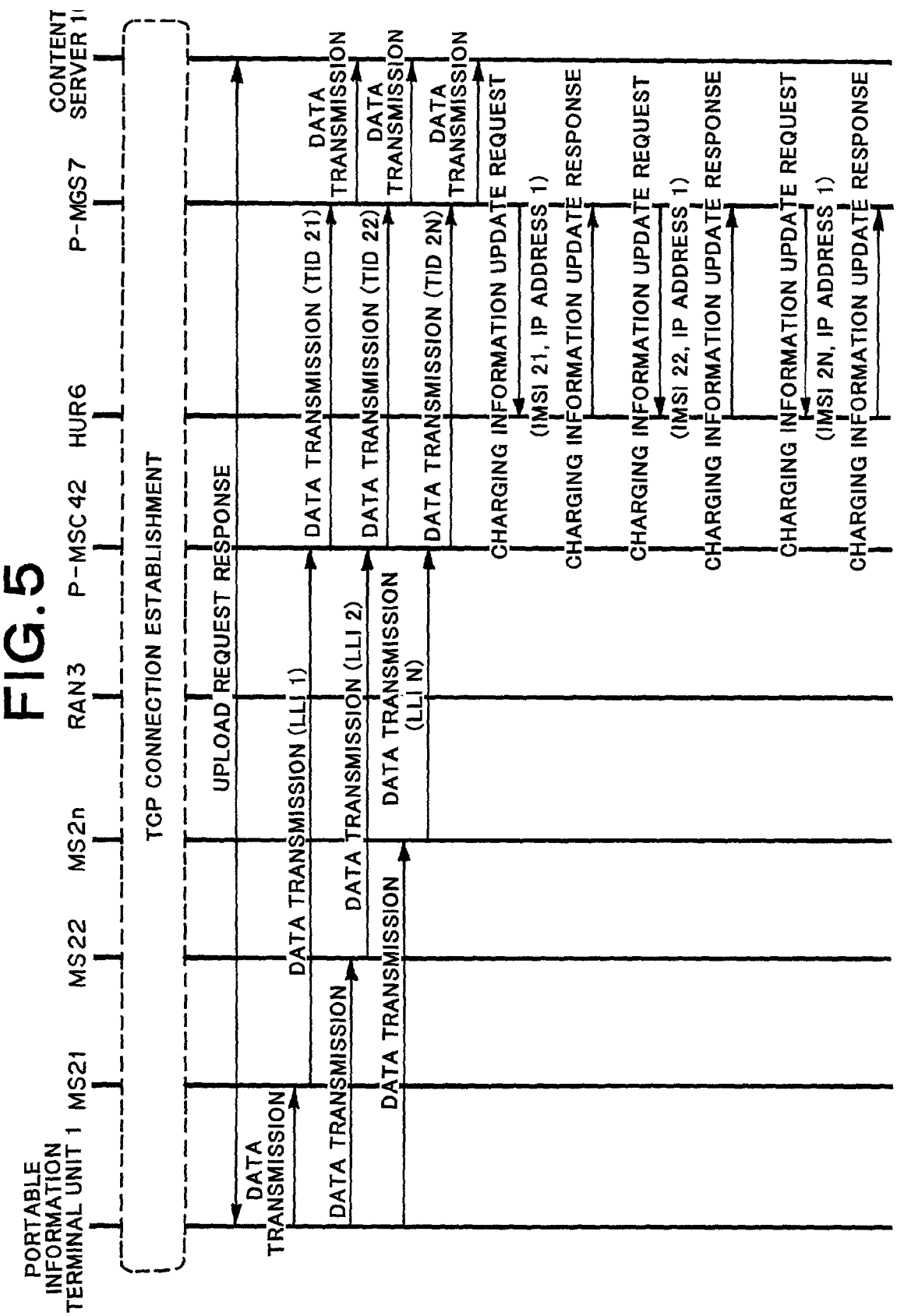

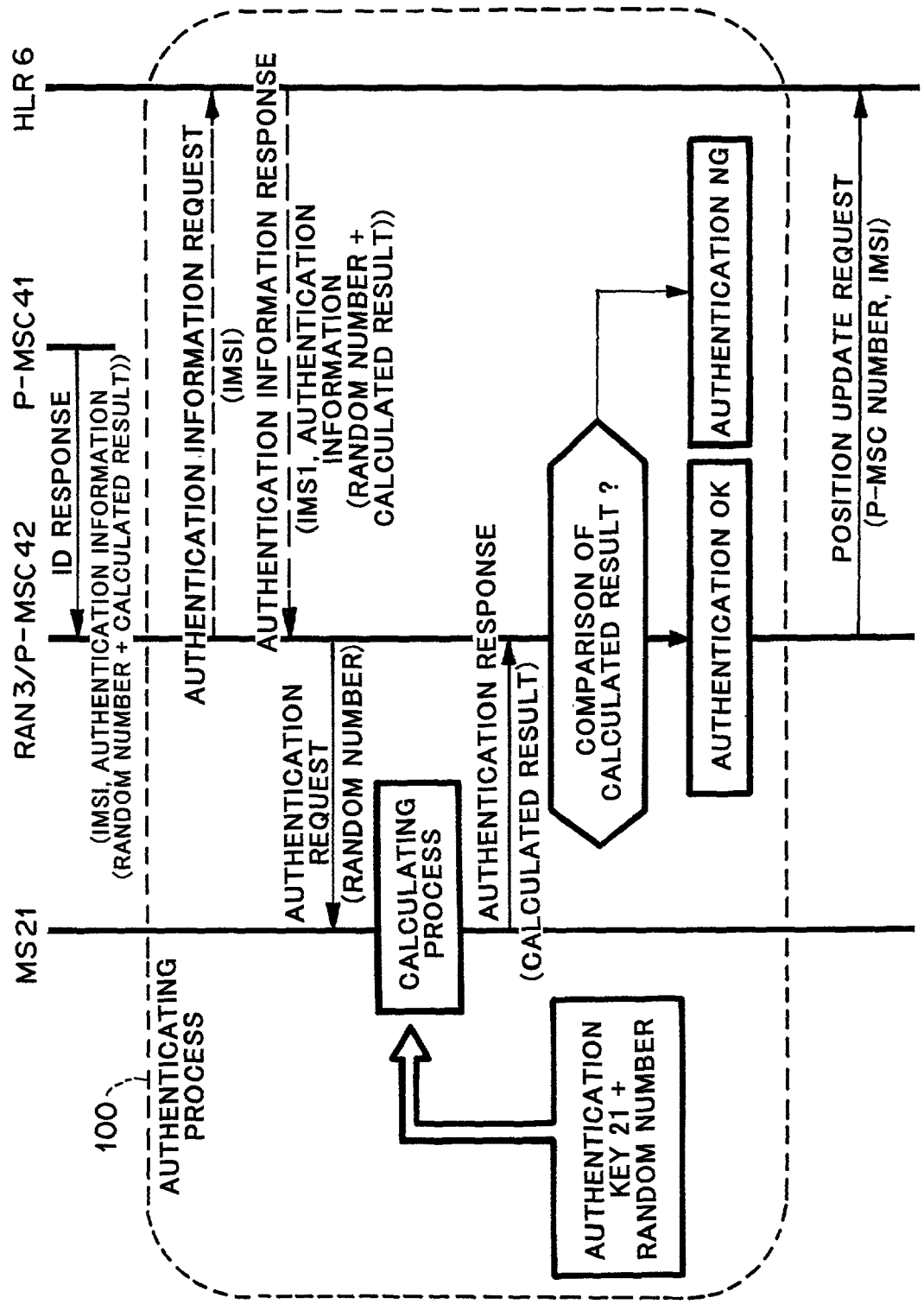

MOBILE COMMUNICATION SYSTEM AND DATA TRANSFERRING METHOD FOR USE WITH MOBILE COMMUNICATION SYSTEM

BACKGROUND OF THE INVENTION

1. Field of the Invention

The present invention relates to a mobile communication system and a data transferring method for use with the mobile communication system, and in particular, to those suitable for a data transfer in a public mobile data communication using a short distance high speed wireless communication technology such as Bluetooth.

2. Description of the Prior Art

In recent years, as the advent of third generation cellular system, a broadband data transfer is becoming accomplished in the mobile communication field. In addition, broadband continuous connection services such as CATV (Cable Television), ADSL (Asymmetrical Digital Subscriber Line), and FTTH (Fiber To The Home) are being provided at low cost.

A first related art reference of the above-mentioned mobile communication is JPA 10-94055. An object of the technology of the first related art reference is to accomplish a highly efficient data communication. The technology of the first related art reference is a wireless communication network system that comprises a transmitting and receiving means, having a wireless transmitting and receiving function, for allowing communication data terminal units to be connected with each other, an exchange line means, connected to the transmitting and receiving means with a wireless communication line, for allowing signals to be communicated among a plurality of transmitting and receiving means, and a data storing means, disposed in the exchange line means, for temporarily storing data at least when data is communicated and for transferring the stored data to a transmitting and receiving means on a receiving side when the transmitting and receiving means on the receiving side can receive data.

A second related art reference of the above-mentioned mobile communication is JPA 11-234749. An object of the technology of the second related art reference is to prevent a data communication path from being disconnected between mobile stations. The technology of the second related art reference is a wireless data communication apparatus that uses two inter-child unit direct communication carriers of a PHS transceiver mode in such a manner that communication stop periods of the two inter-child unit direct communication carriers do not overlap (namely, while one inter-child unit direct communication carrier is in a communication stop state, a route control is performed for the other inter-child unit direct communication carrier so that data can be transmitted and received without an interruption).

A third related art reference of the above-mentioned mobile communication is JPA 11-308176. An object of the technology of the related art reference is to prevent an infrared ray communication function from malfunctioning due to a radio wave radiated from a PHS unit. The technology of the third related art reference is a wireless communication apparatus that comprises an infrared ray communicating means for transmitting and receiving data using infrared ray, a wireless communicating means for transmitting and receiving data through a public network using a radio wave, and a controlling means for transmitting information that represents a transmission period for which data is transmitted from the wireless communicating means to the outside through the infrared ray communicating means and for controlling data transmitted and received by the wireless communicating means on the basis of data received from the outside through the infrared ray communicating means.

However, the above-described related art references have the following disadvantages.

As was described above, as the advent of the third generation cellular system, even in the mobile communication field, a broadband data transfer is being accomplished. However, the data transfer service of the mobile communication does not sufficiently satisfy users with respect to data transfer rate and fee in comparison with wired broadband full time connection services such as CATV, ADSL, and FTTH.

In addition, as a short distance high speed wireless technology such as Bluetooth has been established, user information devices are connected with one another in a wireless network (namely, PAN (Personal Area Network) is formed). These information devices will access a public network through a cellular phone. However, from a view point of the throughput of end-to-end communication (between user information devices that communicate with each other), the data transfer rate of a wireless region of the mobile communication becomes a bottleneck as compared with the transfer rate of the high speed wireless communication such as the backbone of the public wireless network or Bluetooth.

SUMMARY OF THE INVENTION

An object of the present invention is to provide a mobile communication system and a data transferring method for use with the mobile communication system that allow to temporarily use wireless line resources of other mobile stations as well as a local mobile station so as to transfer data in a public mobile data communication using a short distance high speed wireless communication technology such as Bluetooth, thereby improving the throughput of a data transfer from a view point of the user.

According to a first aspect of the present invention, there is provided a mobile communication system, comprising: an information terminal unit; a plurality of mobile stations, each of which communicates with the information terminal unit; a packet mobile switching center which communicates with the plurality of mobile stations through a radio access network; a packet mobile gateway switching center which communicates with the packet mobile switching center through a mobile data network; and a content server which communicates with the packet mobile gateway switching center through the Internet; wherein the information terminal unit downloads or uploads data from or to the content server through the plurality of mobile stations.

According to a second aspect of the present invention, there is provided a data Transferring Method for use with Mobile Communication System, the method comprising the steps of: causing an information terminal unit to communicate with a plurality of mobile stations; causing the plurality of mobile stations to communicate with a packet mobile switching center through a radio access network; causing the packet mobile switching center to communicates with a packet mobile gateway switching center through a mobile data network; causing the packet mobile gateway switching center to communicate with a content server through the Internet; causing the information terminal unit to download or upload data from or to the content server through the plurality of mobile stations.

These and other objects, features and advantages of the present invention will become more apparent in light of the following detailed description of the best mode embodiment thereof, as illustrated in the accompanying drawings.

BRIEF DESCRIPTION OF DRAWINGS

FIG. 3 is a sequence diagram showing an example of a user registration procedure for executing a data transferring method according to the embodiment of the present invention;

FIG. 4 is a sequence diagram showing an example of a data download procedure using the data transferring method according to the embodiment of the present invention;

FIG. 5 is a sequence diagram showing an example of a data upload procedure using the data transferring method according to the embodiment of the present invention; and FIG. 6 is a sequence diagram showing an authenticating process in a packet communication registration procedure according to the embodiment of the present invention.

DESCRIPTION OF PREFERRED EMBODIMENTS

Next, with reference to the accompanying drawings, embodiments of the present invention will be described in detail.

(1) Explanation of Structure

Figure 1:
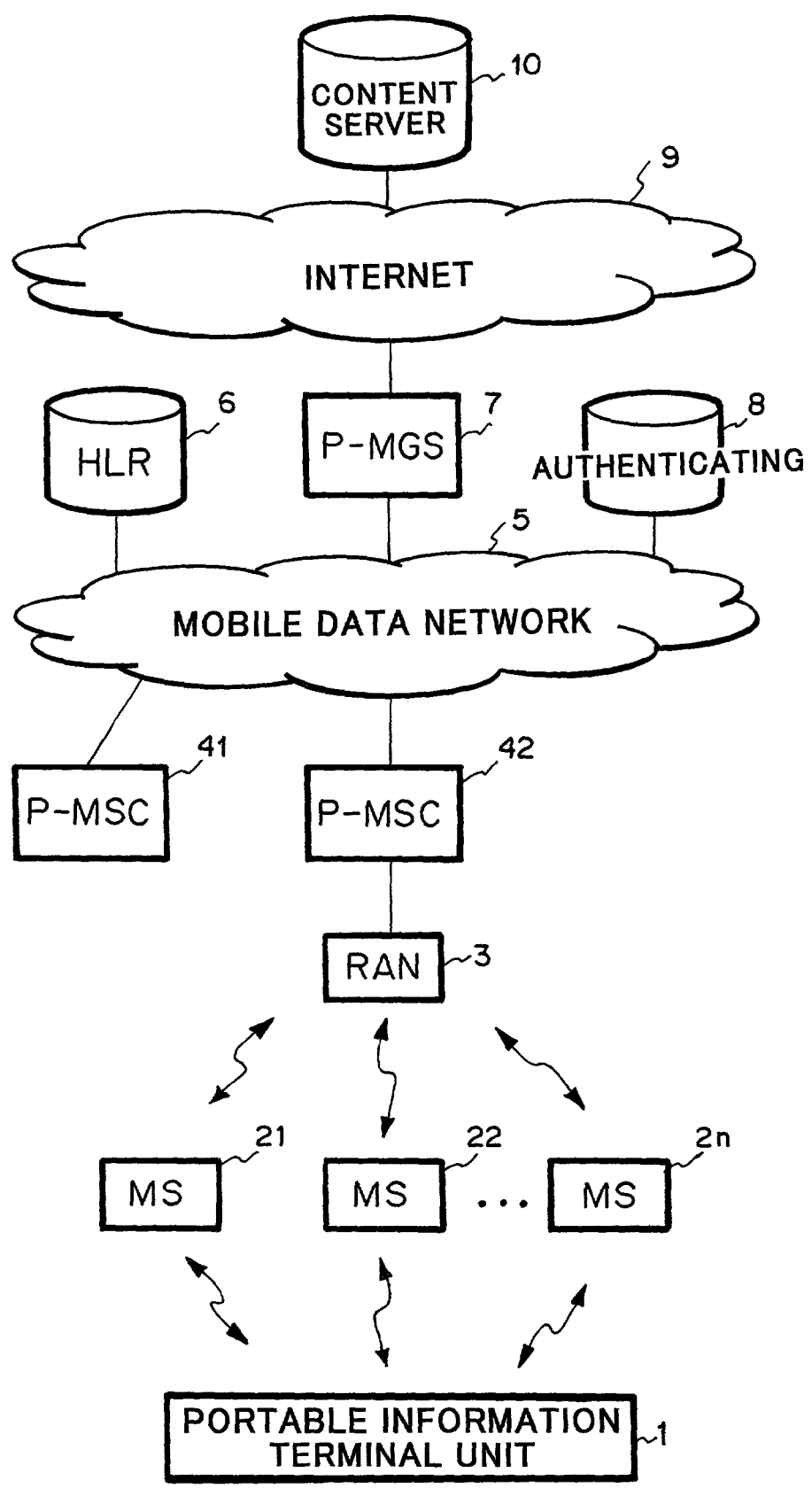
FIG. 1 is a block diagram showing an example of the structure of a public mobile communication system according to an embodiment of the present invention.

FIG. 1 is a block diagram showing an example of the structure of a public mobile communication system using a data transferring method according to an embodiment of the present invention. The public mobile communication system according to the embodiment of the present invention comprises a portable information terminal unit 1, mobile stations (hereinafter abbreviated as MSs) 21 to 2n, a RAN (Radio Access Network) 3, which is a wires line controlling means, packet mobile switching centers (hereinafter abbreviated as P-MSCs) 41 and 42, a mobile data network 5, a home location register (hereinafter abbreviated as HLR) 6, a packet mobile gateway switching center (hereinafter abbreviated as P-MGS) 7, an authenticating server 8, the Internet 9, and a content server 10.

Next, the structure of the public mobile communication system will be described in detail. The portable information terminal unit 1 is a mobile device such as a PC, a PDA (Personal Digital Assistant), or a portable music player. The portable information terminal unit 1 accesses the mobile data network 5 through the MS 21 to MS 2n, obtains information such as a web content, a video file, a music file, or the like from the content server 10 of the Internet 9, and displays the content or reproduces music. The portable information terminal unit 1 has a short distance high speed wireless interface such as Bluetooth. The portable information terminal unit 1 has a function for exchanging data with the MS 21 to MS 2n through the short distance high speed wireless interface.

The MS 21 to MS 2n have communication devices for connecting them to the mobile data network 5 through the RAN 3 and the P-MSC 41 or 42. The MS 21 to MS 2n have a short distance high speed wireless interface such as Bluetooth. The MS 21 to MS 2n have a function for exchanging data with the portable information terminal unit 1 through the short distance high speed wireless interface.

The RAN 3 is a wireless line controlling device for relaying wireless communications of the MS 21 to MS 2n. The RAN 3 is composed of a base station (BS) and an RNC (Radio Network Controller).

Each of the P-MSC 41 and P-MSC 42 connects the MS 21 to MS 2n to the mobile data network 5 and perform a communication packet exchanging process. The HLR 6 correlatively stores subscriber information and position information of the MS 21 to MS 2n and an IP address of the portable information terminal unit 1. In addition, the HLR 6 manages charging information of the MS 21 to MS 2n and the portable information terminal unit 1. The HLR 6 has a function for outputting charging information to a charging center disposed in the mobile data network 5 when needed.

The P-MGS 7 is disposed in the mobile data network 5. The P-MGS 7 is a gateway device that connects the mobile data network 5 and the Internet 9. The authenticating server 8 is disposed in the mobile data network 5. The authenticating server 8 stores a user ID and password of the portable information terminal unit 1. When a packet communication is started, the authenticating server 8 performs an authenticating process for the portable information terminal unit 1 in response to a request from the P-MGS 7. The content server 10 transmits a predetermined content to the portable information terminal unit 1 in response to a content request received from the portable information terminal unit 1 through the Internet 9.

(2) Description of Operation

Next, with reference to FIGS. 1 to 6, the operation of the embodiment of the present invention will be described in detail.

<Packet Communication Registration Procedure>

Figure 2:
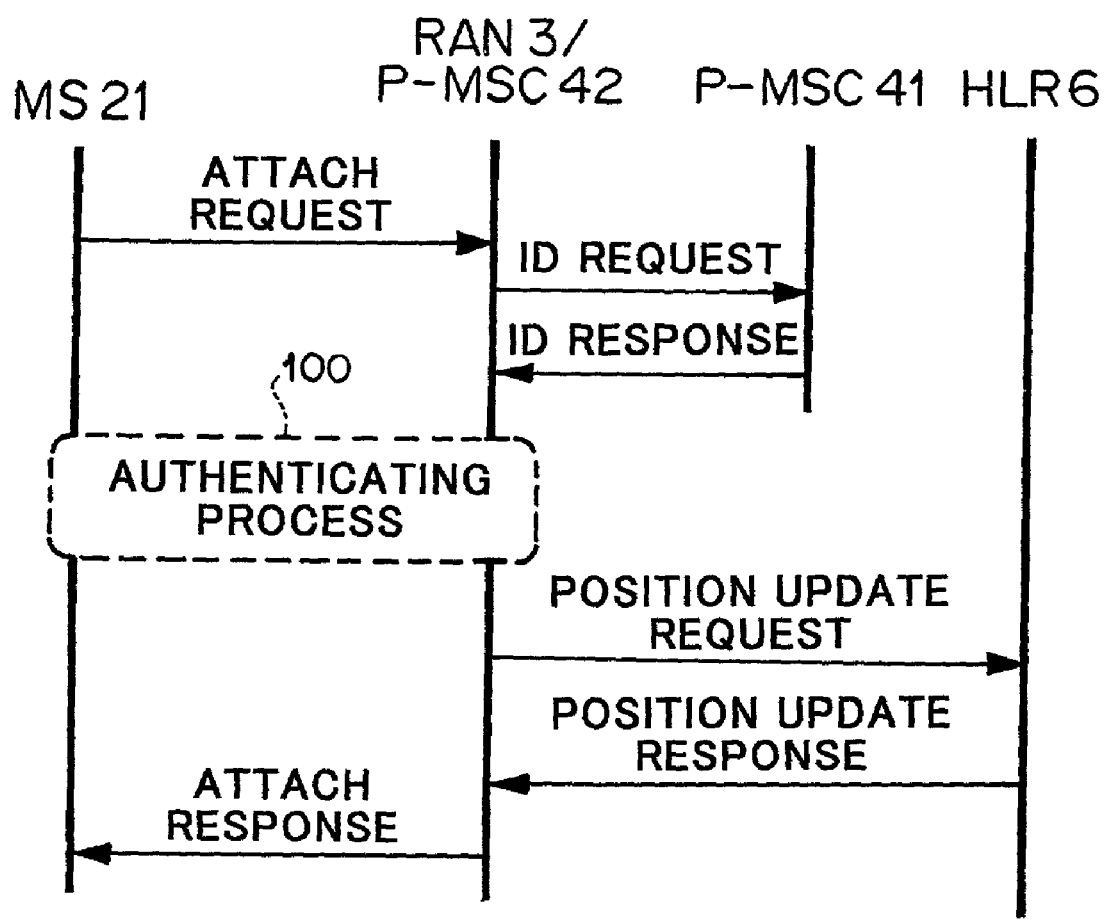
FIG. 2 is a sequence diagram showing a packet communication registration procedure used in a conventional mobile data communication system.

First of all, the sequence shown in FIG. 2 will be described. The packet communication registration procedure shown in FIG. 2 is executed to register position information and so forth of the mobile stations (MS 21 to MS 2n). The packet communication registration procedure is a procedure that is generally used in the mobile data communication system. Next, with reference to FIG. 2, the packet communication registration procedure will be described.

When the power of the MS 21 is turned on or the user of the MS 21 moves, the MS 21 recognizes that the position registered area has been changed. At that point, the MS 21 transmits an Attach request signal to the P-MSC 42. The Attach request signal contains a P-TMSI (Packet Temporarily Mobile Station Identifier) and old position registered area code. The P-TMSI is an ID of a mobile station that is temporarily obtained from the P-MSC 41 to which the MS 21 has belonged. On the other hand IMSI (International Mobile Station Identifier) is an ID of the mobile station which is unique to the mobile station and permanent.

When the P-MSC 42 receives the Attach request signal from the MS 21 through the RAN 3, the P-MSC 42 identifies the P-MSC 41 to which the MS 21 has belonged on the basis of both the P-TMSI and the old position registered area code contained in the Attach request signal, and transmits an ID request signal to the P-MSC 41.

When the P-MSC 41 receives the ID request signal from the P-MSC 42, the P-MSC 41 transmits a mobile station ID and authentication information as an ID response signal on the basis of the P-TMSI contained in the ID request signal to the P-MSC 42. The P-MSC 42 performs an authenticating process 100 for the MS 21 on the basis of the authentication information of the MS 21 received from the P-MSC 41, confirms the validity of the MS 21, and transmits a position update request signal to the HLR 6 so as to inform the HLR 6 that the MS 21 is belonging to the P-MSC 42.

When the HLR 6 receives the position update request signal from the P-MSC 42, the HLR 6 updates the position information of the MS 21 and transmits a position update response signal that contains subscriber information such as the mobile station ID of the MS 21, the authentication information, and "multi data transfer service subscription information" that represents whether or not the MS 21 has subscribed to the data transfer service according to the present invention to the P-MSC 42.

When the P-MSC 42 receives the position update response signal from the HLR 6, the P-MSC 42 stores the subscriber information of the MS 21 contained in the position update response signal, assigns a new P-TMSI to the MS 21, and informs the MS 21 of the new P-TMSI using an Attach response signal.

When the MS 21 receives the Attach response signal from the P-MSC 42 through the RAN 3, the MS 21 stores the new P-TMSI contained in the Attach response signal.

As a result, the packet communication registration procedure of the MS 21 is completed. The packet communication registration procedure of the MS 21 applies to each of the MS 22 to MS 2n. However, their description will be omitted.

<User Registration Procedure>

Next, a user registration procedure will be described. The user registration procedure shown in FIG. 3 is a procedure executed for registering address information and so forth of the portable information terminal unit 1 to the mobile data network 5 before the portable information terminal unit 1 communicates with the mobile data network 5 and the Internet 9 through the mobile stations (MS 21 to MS 2n). Next, with reference to FIG. 3, the user registration procedure according to the present invention will be described.

A user A who owns the portable information terminal unit 1 and the MS 21 starts issuing a connection request to the mobile data network 5 and the Internet 9 using the portable information terminal unit 1. At that point, the user A inputs a user ID and a password that have been registered with the mobile data network 5. When the portable information terminal unit 1 receives the connection request from the user A, the portable information terminal unit 1 establishes a high speed wireless communication link (such as Bluetooth) with the MS 21. Thereafter, the portable information terminal unit 1 transmits a log in request signal to the MS 21. The log in request signal contains an IP address 1 of the portable information terminal unit 1, an APN (Access Point Number) that represents the position of an access point, the user ID, and the password.

When the MS 21 receives the log in request signal from the portable information terminal unit 1, the MS 21 transmits a PDP (Packet Data Protocol)—Activate request signal to the P-MSC 42. The PDP—Activate request signal contains the APN, the current P-TMSI, the IP address 1, the user ID, and the password.

When the P-MSC 42 receives the PDP—Activate request signal form the MS 21, the P-MSC 42 recognizes that the access point to be connected is the P-MGS 7 on the basis of the APN. In addition, the P-MSC 42 searches an IMSI 21 corresponding to the current P-TMSI, generates an user identifier (TID: Tunneling ID) with which data of the MS 21 is exchanged with the P-MGS 7, and transmits a PDP—Activate request signal to the P-MGS 7. The PDP—Activate request signal contains the TID 21, the IMSI 21, the IP address 1, the use ID, the password, and the node number of the P-MSC (IP address) that have been created.

When the P-MGS 7 receives the PDP—Activate request signal from the P-MSC 42, the P-MGS 7 transmits an authentication request signal that contains the User ID and the password that are contained in the PDP—Activate request signal to the authenticating server 8. The authenticating server 8 confirms the validity of the user ID and the password on the basis of the authentication request received from the P-MGS 7 and transmits an authentication response signal to the P-MGS 7.

When the P-MGS 7 receives the authentication response signal from the authenticating server 8 and confirms the validity of the user, the P-MGS 7 creates a database for the user (PDP—Context), stores the database, and transmits a PDP—Activate response signal to the P-MSC 42. The PDP—Activate response signal contains the TID 21 and the IP address 1. On the other hand, the PDP—Context created by and stored in the P-MGS 7 contains information of the IMSI 21, the IP address 1, the TID 21, the P-MSC number (P-MSC 42), and so forth.

When the P-MSC 42 receives the PDP—Activate response signal from the P-MGS 7, the P-MSC 42 assigns a logical link ID (LLI) 1 to the MS 21 and transmits a PDP—Activate response signal to the MS 21. The PDP—Activate response signal contains the IP address 1 and the LLI 1. Similar to the P-MGS 7, the P-MSC 42 creates and stores a PDP—Context for the user. The PDP—Context contains information of the IMSI 21, the current P-TMSI, the IP address 1, the TID 21, the LLI 1, the P-MGS number (P-MGS 7), and so forth.

When the MS 21 receives the PDP—Activate response signal from the P-MSC 42, the MS 21 stores the IP address 1 and the LLI 1 contained in the PDP—Activate response signal and transmits a log in response signal to the portable information terminal unit 1.

As a result, the user registration procedure for the MS 21 of the portable information terminal unit 1 is completed.

Thereafter, the portable information terminal unit 1 transmits a Paging request to an adjacent MS through the high speed wireless interface. When the MS 22 of a user B receives the Paging request from the portable information terminal unit 1, the MS 22 transmits a response signal to the portable information terminal unit 1 and establishes a high speed wireless link with the portable information terminal unit 1. It is preferred that the user B can pre-designate the MS 22 as to whether or not the MS 22 responses to the Paging request from the portable information terminal unit 1.

After the high speed wireless link is established with the MS 22, similar to the user registration procedure for the MS 21, the portable information terminal unit 1 transmits a log in request to the MS 22. The MS 22 transmits a PDP—Activate request signal to the P-MSC 42.

When the P-MSC 42 receives the PDP—Activate request signal from the MS 22, the P-MSC 42 checks that a PDP Context has been created on the basis of an IP address 1 contained in the PDP—Activate request signal. Thereafter, the P-MSC 42 searches the current P-TMSI for the IMSI 22 and newly creates a TID 22 necessary for exchanging data of the MS 22 with the P-MGS 7 and transmits a PDP—Context update request signal to the P-MGS 7. The PDP—Context update request signal contains the TID 22, the IMSI 22, the IP address 1, the user ID, the password, and the node number (IP address) of the current P-MSC that have been created.

When the P-MGS 7 receives the PDP—Context update request signal form the P-MSC 42, the P-MGS 7 transmits an authentication request signal that contains the user ID and the password contained in the PDP—Context update request signal to the authenticating server 8. The authenticating server 8 confirms the validity of the user ID and the password on the basis of the authentication request received from the P-MGS 7 and transmits an authentication response signal to the P-MGS 7.

When the P-MGS 7 receives the authentication response signal form the authenticating server 8 and confirms the validity of the user, the P-MGS 7 updates the created PDP—Context for the user and transmits a PDP—Context update response signal to the P-MSC 42. The PDP—Context update response signal contains the TID 22 and the IP address 1. Information added to the PDP—Context by the P-MGS 7 is the IMSI 22 and the TID 22.

When the P-MSC 42 receives the PDP—Context update response signal from the P-MGS 7, the P-MSC 42 assigns a logical link ID 2 (LLI 2) to the MS 22 and transmits a PDP—Activate response signal to the MS 22.

The PDP—Activate response signal contains the IP address 1 and the LLI 2.

Similar to the P-MGS 7, the P-MSC 42 adds the I-MSI 22, the P-MSI 22, the LLI 2, and the TID 22 to the PDP—Context for the user.

When the MS 22 receives the PDP—Activate response signal from the P-MSC 42, the MS 22 stores the IP address 1 and the LLI 2 contained in the PDP—Activate response signal and transmits a log in response signal to the portable information terminal unit 1.

As a result, the user registration procedure for the MS 22 of the portable information terminal unit 1 is completed.

When the portable information terminal unit 1 executes the user registration procedure for another MS (MS 2n) disposed adjacent to the portable information terminal unit 1, the portable information terminal unit 1 can perform the same procedure as that performed for the MS 22. In the sequence of the above-described user registration procedure, a pico network is formed among the MS 21 to MS 2n serving as slaves and the portable information terminal unit 1 serving as a master.

<Data Download Procedure>

Next, with reference to FIG. 4, a data download procedure according to the present invention will be described.

After the user registration procedure shown in FIG. 3 is completed, the portable information terminal unit 1 establishes a TCP (Transmission Control Protocol) connection with the content server 10 and then transmits a content request signal to the content server 10 using a predetermined protocol such as HTTP (Hyper Text Transfer Protocol) or FTP (File Transfer Protocol).

When the content server 10 receives the content request signal from the portable information terminal unit 1, the content server 10 transmits a requested content as IP datagrams to the portable information terminal unit 1. The address of the IP datagrams to be transmitted is an IP address 1, which is the address of the portable information terminal unit 1.

When the P-MGS 7 receives the IP datagrams from the content server 10, the P-MGS 7 searches a PDP—Context on the basis of the address (IP address 1) to which data is to be transmitted and recognizes that the user (IP address 1) has been registered with a plurality of MSs, capsules the received IP datagrams along with the registered TIDs (TID 21 to TID 2n), and successively transmits the capsuled data to the P-MSC 42.

The address of the capsulated IP datagrams to be transmitted is the IP address of the P-MSC 42. The transmission ratio of the MS 21 to MS 2n (=TID 21 to TID 2n) for the IP address 1 may be even or arbitrarily designated.

The P-MSC 42 un-capsules the self-addressed capsuled IP datagrams, extracts the original IP datagram (IP address 1 to which data is transmitted), and transmits data to the MS 21 to MS 2n to be transferred using the LLI 1 to LLI n corresponding to the assigned TID 21 to TID 2n.

When the MS 21 to MS 2n receive data from the P-MSC 42, the MS 21 to MS 2n transmit the data to the portable information terminal unit 1. When data is transferred between each MS and the portable information terminal unit 1, the portable information terminal unit 1 serving as the master of the pico network controls the synchronization with each MS.

The P-MSC 42 measures the amount of data for which responses from MSs are confirmed in layer 2 link (LLI) level and stores the measured amount of data. The P-MSC 42 frequently informs the HLR 6 of the traffic information using a charging information update request. The charging information update request signal contains an IMSI, an IP address 1, and traffic information (the amount of data having been transmitted) of each MS.

The HLR 6 updates charging information of the IP address 1 (=IMSI 21) on the basis of the charging information update request signal received from the P-MSC 42.

As a result, the data download procedure according to the present invention is completed.

<Data Upload Procedure>

Next, with reference to FIG. 5, a data upload procedure according to the present invention will be described.

After the user registration procedure shown in FIG. 3 is completed, the portable information terminal unit 1 establishes a TCP connection with the content server 10 and then transmits an upload request signal using, for example, HTTP or FTP to the content server 10. Thereafter, the portable information terminal unit 1 receives a response signal from the content server 10 and then successively transmits data as IP datagrams to the MS 21 to MS 2n. The address of the IP datagrams to be transmitted is an IP address 10, which is the IP address of the content server 10.

When the MS 21, MS 22, and MS 2n receive data from the portable information terminal unit 1, the MS 21, MS 22, and MS 2n transmit data to the P-MSC 42 using the LLI 1, LLI 2, and LLI n, respectively.

When the P-MSC 42 receives data from the MS 21, MS 22, and MS 2n, the P-MSC 42 capsules the received data along with the TID for each of the LLI1, LLI2, and LLIn, respectively, and transmits the capsuled data to the P-MGS 7. The address of the capsuled IP datagrams to be transmitted is the IP address of the P-MGS 7.

The P-MGS 7 un-capsules the self-addressed capsuled IP datagrams, extracts the original IP datagrams (IP address 10 to which the data is to be transmitted) from the IP datagrams, and transmits the IP datagrams to the content server 10 through the Internet 9. In addition, the P-MGS 7 measures the amount of data transmitted to the Internet 9 and stores the measured amount of data. The P-MGS 7 frequently informs the HLR 6 of the traffic information using a charging information update request. The charging information update request signal contains an IMSI, an IP address 1, and traffic information (the amount of data having been transmitted) of each MS.

The HLR 6 updates the charging information of the IP address 1 (=IMSI 21) on the basis of the charging information update request signal received from the P-MGS 7.

As a result, the data upload procedure according to the present invention is completed.

Next, with reference to FIG. 6, the authenticating process 100 of the packet communication registration procedure shown in FIG. 2 will be described.

The authenticating process 100 shown in FIG. 6 is a well known procedure performed to confirm the validity of an MS (in this example, MS 21) that had issued an Attach request when the mobile data network 5 has received the Attach requests from the MS 21.

As was described above, in the authenticating process 100 shown in FIG. 6, upon receiving an Attach request signal, the P-MSC 42 detects the P-MSC 41 to which the MS 21 has belonged on the basis of a current P-TMSI and old position registered area code which are contained in the Attach request signal, transmits an ID request signal to the P-MSC 41, and obtains a mobile station ID and authentication information of the MS 21 from the P-MSC 41.

The authentication information of the MS 21 is a pair of a random number created using a predetermined algorithm and a result of calculation using the random number and an authentication key unique to the MS 21 (namely, random number+calculated result). The authentication information is created by the HLR 6. Whenever the process of authenticating the MS 21 is executed, the authentication information (random number+calculated result) is consumed.

If the P-MSC 41 does not have authentication information for the MS 21 (namely, the authentication information has been already consumed) when the P-MSC 42 makes a request to the P-MSC 41 for an ID, the P-MSC 42 makes a request to the HLR 6 for the authentication information and obtains new authentication information for the MS 21.

When the P-MSC 42 obtains the authentication information, the P-MSC 42 extracts one pair (random number +calculated result) from the obtained authentication information and transmits only the extracted random number as an authentication request signal to the MS 21. The MS 21 performs a predetermined calculating process using the self authentication key and the random number received as the authentication request signal from the P-MSC 42 and transmits the calculated result as an authentication response signal to the P-MSC 42. The P-MSC 42 compares the calculated result received from the MS 21 with the calculated result contained in the authentication information and confirms the validity of the MS 21.

As was described above, according to the embodiment of the present invention, when data is transferred in a public mobile data communication using a short distance high speed wireless communication technology such as Bluetooth, it can be expected to improve the throughput of a data transfer from a view point of a user, because wireless line resources of a plurality of mobile stations other than that of a local mobile station can be temporarily used.

Other Embodiment

In the above-described embodiment, Bluetooth, which is a short distance wireless communication standard, was exemplified as a communicating system between the portable information terminal unit 1 and each of the mobile stations 21 to 2n. However, besides Bluetooth, IrDA (Infrared Data Association), which is a data communication interface using infrared ray, Home RF (Home Radio Frequency), which is a home use simple wireless LAN specification, or a wired interface can be used.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A mobile communication system, comprising:
a portable information terminal unit;
a plurality of mobile stations capable of participating simultaneously in communication with said portable information terminal unit;
a packet mobile switching center which is adapted to communicate with said plurality of mobile stations through a radio access network;
a packet mobile gateway switching center which is adapted to communicate with said packet mobile switching center through a mobile data network; and
a content server which is adapted to communicate with said packet mobile gateway switching center through the Internet;
wherein said portable information terminal unit is adapted to download or upload data from or to said content server through the plurality of mobile stations, wherein the data is divided into a plurality of pieces and each of the plurality of mobile stations uploads or downloads only a portion of the plurality of pieces of the data.

2. A mobile communications system comprising:
a portable information terminal unit, wherein:
said portable information terminal unit is adapted to communicate with a plurality of mobile stations,
said plurality of mobile stations are capable of participating simultaneously in communication with a packet mobile switching center through a radio access network,
said packet mobile switching center is adapted to communicate with a packet mobile gateway switching center through a mobile data network,
said mobile gateway switching center is adapted to communicate with a content server through the Internet, and
said portable information terminal unit is adapted to download or upload data from or to said content server through said plurality of mobile stations, wherein the data is divided into a plurality of pieces and each of the plurality of mobile stations uploads or downloads only a portion of the plurality of pieces of the data.

3. A mobile communications system comprising:
a first mobile station, capable of participating simultaneously with at least a second mobile station, in communication with a portable information terminal, wherein:
at least said first and second mobile stations are adapted to communicate with a packet mobile switching center through a radio access network,
said packet mobile switching center is adapted to communicate with a packet mobile gateway switching center through a mobile data network,
said mobile gateway switching center is adapted to communicate with a content server through the Internet, and
said portable information terminal unit is adapted to download or upload data from or to said content server through at least said first and second mobile stations, wherein the data is divided into a plurality of pieces and each of the first and second mobile stations uploads or downloads only a portion of the plurality of pieces of the data.

4. A packet mobile switching center which is adapted to communicate with a plurality of mobile stations through a radio access network, wherein:
said plurality of mobile stations are capable of participating simultaneously in communication with a portable information terminal unit,
said packet mobile switching center is adapted to communicate with a packet mobile gateway switching center through a mobile data network,
said mobile gateway switching center is adapted to communicate with a content server through the Internet, and
said portable information terminal unit is adapted to download or upload data from or to said content server through the plurality of mobile stations, wherein the data is divided into a plurality of pieces and each of the plurality of mobile stations uploads or downloads only a portion of the plurality of pieces of the data.

5. A packet mobile gateway switching center which is adapted to communicate with a packet mobile switching center is adapted to communicate with a plurality of mobile stations through a radio access network, said plurality of mobile stations are capable of participating simultaneously in communication with an information terminal unit, said mobile gateway switching center is adapted to communicate with a content server through the Internet, and said portable information terminal unit is adapted to download or upload data from or to said content server through the plurality of mobile stations, wherein the data is divided into a plurality of pieces and each of the plurality of mobile stations uploads or downloads only a portion of the plurality of pieces of the data.

6. A contents server which is adapted to communicate with a packet mobile gateway switching center through the Internet, wherein:

said packet mobile gateway switching center is adapted to communicate with a packet mobile switching center through a mobile data network, said packet mobile switching center is adapted to communicate with a plurality of mobile stations through a radio access network, said plurality of mobile stations are capable of participating simultaneously in communication with a portable information terminal unit, and said portable information terminal unit data is adapted to download or upload from or to said content server through the plurality of mobile stations, wherein the data is divided into a plurality of pieces and each of the plurality of mobile stations uploads or downloads only a portion of the plurality of pieces of the data.

7. A data transferring method for use with a mobile communication system, said method comprising the steps of causing:

a portable information terminal unit to communicate with a plurality of mobile stations, the mobile stations being capable of participating simultaneously in communication with the portable information terminal unit;

said plurality of mobile stations to communicate with a packet mobile switching center through a radio access network;

said packet mobile switching center to communicate with a packet mobile gateway switching center through a mobile data network;

said packet mobile gateway switching center to communicate with a content server through the Internet; and said portable information terminal unit to download or upload data from or to said content server through the plurality of mobile stations, wherein the data is divided into a plurality of pieces and each of the plurality of mobile stations uploads or downloads only a portion of the plurality of pieces of the data.

* * * * *